March 30, 1954
C. G. GRUETT
2,673,479
BORING TOOL
Filed June 30, 1950
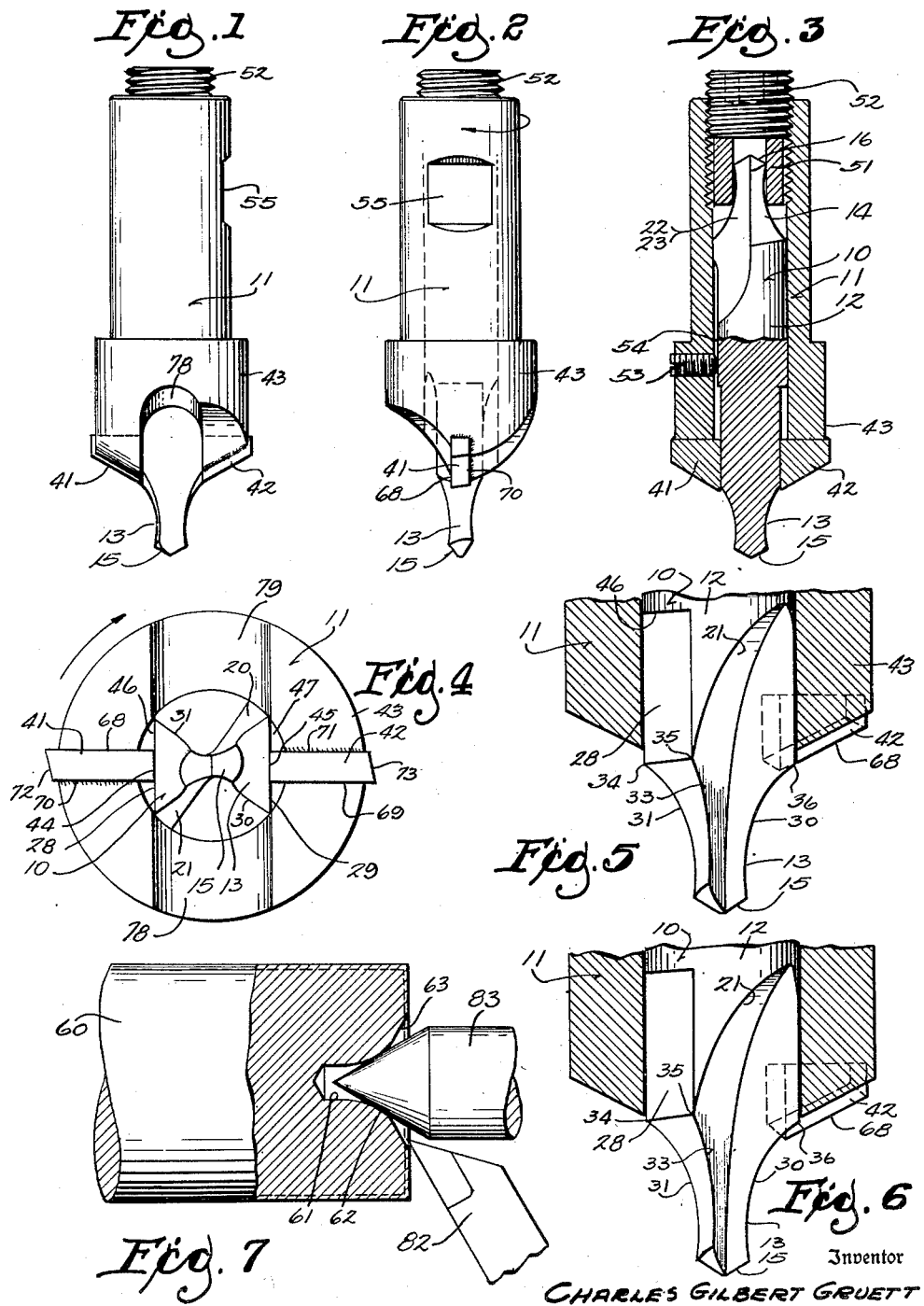
Inventor
CHARLES GILBERT GRUETT
By
Miles Kenninger
Attorney Patented Mar. 30, 1954

2,673,479

UNITED STATES PATENT OFFICE 2,673,479

BORING TOOL

Charles Gilbert Gruett, Wauwatosa, Wis., assignor to The Falk Corporation, Milwaukee, Wis., a corporation of Wisconsin Application June 30, 1950, Serial No. 171,403

6 Claims. (Cl. 77—66)

This invention relates to tools for machining center sockets of a kind commonly used to receive a lathe center for the support and accurate positioning of a work piece in a lathe.

Center sockets are commonly of outwardly flaring form, adapted to receive and solidly contact the usual conical end portion of a lathe center, and they usually include a substantially cylindrical extension at the base thereof to provide ample clearance for the tip of the center. In some instances the surfaces of the flared portion of the socket are convexly curved in an axial direction so as to provide a narrow band or "line" contact with the lathe center. A socket of that form and a tool for forming the same are shown in the Klemm Patent No. 2,403,861, dated July 9, 1946.

As heretofore formed, the center socket is substantially covered by the body of the lathe center when the work piece is mounted in the lathe, thus rendering it impossible or impracticable to end face the work piece while so mounted. End facing has thus heretofore involved the additional time and expense of a separate operation.

An object of the present invention is to provide a composite tool for forming a center socket and for enlarging the open end of the socket so as to permit end facing of the work piece while the lathe center is engaged in the center socket thus formed.

Another object is to provide a center socket forming tool having means for cutting a conically flared counter-sink in the open end of the socket to enlarge the same during the socket forming operation.

Another object is to provide a composite tool having an outer counter-sinking portion and an inner center socket forming portion releasably mounted therein.

Objects and advantages other than those above set forth will be apparent from the following description when read in connection with the accompanying drawing in which:

Fig. 1 is a side view of a composite tool embodying the present invention;

Fig. 2 is another side view of the tool shown in Fig. 1, the view of Fig. 2 being taken at right angles to the view of Fig. 1;

Fig. 3 is a sectional view of the tool shown in Fig. 1, the view of Fig. 3 being taken on a plane through the longitudinal axis of the tool, and an upper part of a drill being shown in elevation;

Fig. 4 is an enlarged end view of the forward end of the tool shown in Fig. 1;

Figs. 5 and 6 are fragmentary detail views of the tool on a larger scale, illustrating the socket forming and counter-sinking portions in different relative positions of adjustment;

Fig. 7 is a fragmentary view, partly in section, of a work piece having a center socket formed by the tool herein disclosed, and illustrating the novel relation between the supporting lathe center and end facing tool whereby the latter may clear the lathe center in performing an end facing operation.

The composite tool shown comprises a double ended drill 10 for forming a center socket, and a hollow shank 11 in which said drill is reversibly mounted and adjustably and detachably fixed. The drill 10 has a substantially cylindrical body portion 12 adapted to fit within the shank 11 and terminating at each end in a tapered cutting portion of a well known type, such as disclosed in the patent above identified. It includes a concavely tapered cutting section 13 formed integrally with the body 12 at the lower end of the latter, another concavely tapered cutting section 14 formed integrally with the body at the upper end of the latter, and pilot portions including cutting tips 15 and 16. Pairs of flutes 20, 21 and 22, 23 are formed at the ends of the drill in the usual manner. As shown in Fig. 3, flute 22 extends from the tip 16 into the body portion 12, the other flute 23 being paired therewith at the one end of the drill. Flutes 20 and 21 at the other end of the drill, are similarly formed, the formation of the flute 21 being especially illustrated in Figs. 5 and 6. Flat surfaces 28 and 29 are formed on the body portion 12 of the drill between and adjacent flutes 21 and 22, as shown in Figs. 4 and 5, and extend parallel to the axis of the drill. Another pair of flat surfaces (not shown) is formed on the body portion 12 between the flutes 20 and 23 and likewise extend parallel to the axis of the drill. From the above it will be understood that the drill is symmetrical.

The direction in which the tool is rotated for boring is indicated by the arrow in Figs. 2 and 4. Accordingly, the arcuate edges 30 and 31 (see Figs. 5 and 6) form the cutting edges of one of the concavely tapered sections of the drill. One trailing edge is indicated in Figs. 5 and 6.

As shown, especially in Figs. 5 and 6, the flat 28 intersects the arcuate cutting edge 31 at a point 34 and intersects the trailing edge 33 at a point 35. The flat 29 similarly intersects the arcuate cutting edge 30 and trailing edge 32 of the drill, the intersection point between the flat 29 and the arcuate cutting edge 30 being indicated at 36 in Figs. 5 and 6.

Referring particularly to Figs. 3 and 4, a pair of cutting inserts 41 and 42 are secured to an enlarged portion 43 of the shank 11 at the one end of the latter in any suitable manner, as by brazing, the inserts being formed of a very hard metal alloy adapted for high speed cutting such as tungsten carbide. It will be noted that the radial spacing between the relatively opposed ends 44 and 45 of the inserts 41 and 42 is less than the inside diameter of the shank 11. The inside diameter of the shank 11 substantially conforms with the diameter of the drill shank 12, and axial movement of the center drill in a forward direction relative to the shank 11 is limited by engagement of shoulders 46 and 47 at the rear ends of the flats 28 and 29 with the portions of the inserts 41 and 42 extending into the internal space of the shank 11.

In the tool shown, the cutting insert 41 has a cutting edge 68 which extends outwardly from the flat 28 of the center drill and in a rearwardly inclined direction relative to the axis of the latter, and the cutting insert 41 has a cutting edge 69 which similarly extends outwardly from the flat 29 of the center drill and in a rearwardly inclined direction relative to the axis of the latter. The trailing edges of the cutting inserts 41 and 42 are indicated in Fig. 4 by 70 and 71, respectively, and are relieved in accordance with usual practice, as indicated in Fig. 2 for the insert 42. The radially outer end faces 72 and 73 of the inserts 41 and 42, respectively, are also relieved as indicated in Fig. 4.

Rearward axial displacement of the drill relative to the shank from the position in which the drill is shown in Fig. 3, is limited by an abutment which comprises an axially loose collar 51 within the shank 11 at the one end thereof. The collar 51 extends over the concave cutting section 14 of the drill, and is formed to avoid damage to the edges thereof, and the collar bears in rearward axial thrust transmitting relation on a plug 52 screwed into the end of the shank.

Movement of the drill 10 axially within the shank 11 between the limit positions which are determined by engagement of the cutting section 14 with the collar 52 and of the shoulders 46 and 47 with the cutting inserts 41 and 42 of the shank, is prevented by one or more set screws 53 threaded radially into the shank 11, other flats 54 for engagement with the set screws being formed on the drill as indicated in Fig. 3.

A suitable flat 55 is provided on the outside of shank 11 for mounting the tool for rotation by the head stock of a lathe or the like.

Referring now to Fig. 7, a work piece 60 has a center socket which is formed by means of the tool shown. The cylindrical portion 61 and the arcuately flared portion 62 are formed, respectively, by the cutting tip and the concavely tapered cutting section of the drill. The conically flared and axially outer portion 63 is formed by the cutting inserts 41 and 42 of the shank 11.

For smoothly joining or merging the conical countersink 63 with the arcuately flared portion 62, it is necessary that the drill 10 be adjusted to a particular axial position relative to the sleeve 11. Such adjustment of the center drill is readily accomplished by means of the screw plug 52. In Fig. 5, the drill is shown adjusted to an axial position relative to the sleeve such that the cutting edge 68 of the insert 42 is tangent to the arcuate surface generated by the arcuate cutting edge 30 of the center drill. In this position of adjustment the conical taper formed by the cutting edge 68 (and by the corresponding cutting edge 69 of the insert 41) will merge smoothly with the arcuately flared portion formed by the arcuate cutting edges 30 and 31 of the center drill.

Under some conditions a smooth merger of the outwardly flaring surface 63 of the counter-sink with the arcuate surface 62 of the center socket is unnecessary, particularly when the juncture of these surfaces is outside the band of contact between the lathe center 83 and the center socket. Under such conditions the drill 10 may assume an axial position relative to the cutting edge 68 such as shown in Fig. 6.

In any event to insure a clean juncture of the surfaces 62 and 63 the inserts 41 and 42, and the cutting edges 68 and 69 thereof are extended inwardly beyond the surface generated by the arcuate cutting edges 30 and 31 of the drill. For this purpose the inner ends 44 and 45 of the inserts are disposed adjacent the flats 28 and 29, respectively, of the drill, as indicated particularly in Fig. 4, so that the inner ends of the edges 68 and 69 are closer to the longitudinal axis of the tool than are the outer ends 36 and 34 of the cutting edges 30 and 31.

Moreover, the inserts 41 and 42 are preferably rotatively offset from the cutting edges 30 and 31 of the drill, as indicated in Fig. 4, so that the cutting edges 68 and 69 of the inserts lag behind the cutting edges 31 and 30 of the drill during the cutting action. This results in the removal of separate chips by the several cutting edges and a consequent clean juncture between wall surfaces of the wall socket and counter-sink.

As shown in Fig. 7, the tip of the conical end of a supporting lathe spindle 83 extends into cylindrical portion 61 and the conical surface of the spindle engages the arcuately flared portion 62 of the center socket and therefore, has substantially only line contact with the work piece 60. The conical flared portion 63 of the center socket affords proper relief for the supporting center 83 and provides sufficient space thereabout to permit entry of a facing tool 82 between it and the work piece, while the center 83 is engaged in the center socket.

To resharpen the cutting edges 68 and 69 of the inserts 41 and 42, respectively, the tool is disassembled by removing the screw plug 52 and the collar 51 from the shank 11, loosening the set screw 53, and then withdrawing drill 10 from the shank.

As shown in Figs. 1 and 2, the shank head 43 is cut away or notched at 78 between the inserts 41, 42 in registry with the drill flute 21 and is similarly cut away at 79 (see Fig. 4) in registry with the drill flute 22 for movement of the chips from the drill flutes.

Referring to Fig. 7, it is assumed that the portion of the work piece outside of the dotted lines is to be removed by turning and end facing of the piece. With a center socket of a form such as heretofore employed, it is impossible to do the end facing while the work piece is in position for doing the turning operation because of the possibility of damaging the lathe center by the facing tool used for doing the end facing. However, the present outer conical counter-sink 63 provides adequate space for using a facing tool to perform the end facing operation without changing the work piece from the position required for performing the turning operation thereon. A considerable saving of time is thus obtained and the plane end face is more accurately formed at right angles to the axis of the work piece.

Although but one embodiment of the present invention has been illustrated and described, it will be apparent that various changes and modifications may be made therein without departing from the invention as defined in the appended claims.

I claim:

1. A composite tool comprising the combination of a shank, a tool detachably fixed therein and having a cutting portion projecting axially therefrom, said cutting portion including a tapered portion having cutting edges inclined to form a socket having an outwardly flaring convexly curved wall, and cutter inserts carried by said shank and symmetrically disposed about said tool for forming a counter-sink about the open end of said socket, said inserts having cutting edges in lagging relation to said socket forming edges and disposed to extend inwardly beyond the surface generated by the latter and to a level below the upper ends of the latter.

2. A composite tool comprising the combination of a shank, a tool detachably fixed therein and having a cutting portion projecting axially therefrom, said cutting portion including a narrow pilot portion and a tapered portion coaxial therewith and having cutting edges curved to form a socket having an outwardly flaring convexly curved wall, cutter inserts carried by said shank and symmetrically disposed about said tool for forming a counter-sink about the open end of said socket, said inserts having inclined cutting edges in lagging relation to said curved cutting edges and extending substantially tangential to and inwardly beyond the surface generated by said curved cutting edges whereby the wall of said counter-sink merges smoothly into said socket wall, the cutting edges of said inserts terminating inwardly of and at a level below the upper ends of said curved cutting edges.

3. A composite tool for forming a lathe center socket in a workpiece and comprising a shank having a longitudinal bore therethrough, a drill detachably fixed in and having a cutting portion extending from said shank, said cutting portion including a pilot portion for forming a cylindrical portion of the socket and a concavely curved portion for forming a convex flaring wall portion of the socket, and cutter inserts fixed in the end of said shank adjacent the cutting portion of said drill and disposed symmetrically thereabout for forming a countersink at the open end of the socket, said inserts severally having a cutting edge extending toward the axis of said drill for placing the corners of the several edges of said inserts beyond the socket convex wall portion whereby the countersink wall merges smoothly with the socket convex wall portion and the said insert corners are relieved from pressure.

4. A composite tool for forming a lathe center socket in a workpiece and comprising a shank having a longitudinal bore therethrough, a drill detachably fixed in and having a cutting portion extending from said shank, said cutting portion including a pilot portion for forming a cylindrical portion of the socket and a concavely curved portion for forming a convex flaring wall portion of the socket, and cutter inserts fixed in the end of said shank adjacent the cutting portion of said drill and disposed symmetrically thereabout for forming a countersink at the open end of the socket, said inserts severally having a cutting edge extending toward the axis of said drill beyond the socket convex wall portion to position a portion of the several edges at a distance from the corners thereof in tangential relation with the socket convex wall portion whereby the countersink wall merges smoothly with the socket convex wall portion and the extended insert edge portions are relieved from pressure.

5. A composite tool for forming a lathe center socket in a workpiece and comprising a shank having a longitudinal bore therethrough, a drill detachably fixed in and having a cutting portion extending from said shank, said cutting portion including a pilot portion for forming a cylindrical portion of the socket and a concavely curved portion for forming a convex flaring wall portion of the socket, and cutter inserts fixed in the end of said shank adjacent the cutting portion of said drill and disposed symmetrically thereabout for forming a countersink at the open end of the socket, said inserts severally having a cutting edge extending toward the axis of said drill, said insert cutting edges being severally in lagging relation to a cutting edge of the curved portion of said drill whereby the corners of said inserts adjacent said drill are relieved from cutting action and pressure.

6. A composite tool for forming a lathe center socket in a workpiece and comprising a shank having a longitudinal bore therethrough, a drill detachably fixed in and having a cutting portion extending from said shank, said cutting portion including a pilot portion for forming a cylindrical portion of the socket and a concavely curved portion for forming a convex flaring wall portion of the socket, and cutter inserts fixed in the end of said shank adjacent the cutting portion of said drill and disposed symmetrically thereabout for forming a countersink at the open end of the socket, said inserts severally having a cutting edge extending toward the axis of said drill to locate a portion of each cutting edge at a distance from the corners thereof in tangential relation with the socket convex wall and in lagging relation to a cutting edge of the curved portion of said drill whereby the countersink wall merges smoothly with the socket convex wall portion and whereby the corners of said inserts adjacent said drill are relieved from cutting action and pressure.

CHARLES GILBERT GRUETT.

References Cited in the file of this patent

UNITED STATES PATENTS

| Number | Name | Date |
| --- | --- | --- |
| 1,017,352 | Wagner | Feb. 13, 1912 |
| 2,294,969 | Engvall et al. | Sept. 8, 1942 |
| 2,392,519 | Beavon | Jan. 8, 1946 |

FOREIGN PATENTS

| Number | Country | Date |
| --- | --- | --- |
| 567,448 | Great Britain | Feb. 14, 1945 |
| 567,630 | Great Britain | Feb. 23, 1945 |